United States Patent
Takeshima

(10) Patent No.: US 12,057,742 B2
(45) Date of Patent: Aug. 6, 2024

(54) ROTOR FOR ELECTRIC MOTOR, MANUFACTURING METHOD THEREOF, AND MANUFACTURING METHOD OF SHEET USED IN THE MANUFACTURING METHOD

(71) Applicant: TOYOTA JIDOSHA KABUSHIKI KAISHA, Toyota (JP)

(72) Inventor: Kenta Takeshima, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 92 days.

(21) Appl. No.: 17/662,245

(22) Filed: May 6, 2022

(65) Prior Publication Data
US 2022/0376572 A1 Nov. 24, 2022

(30) Foreign Application Priority Data
May 20, 2021 (JP) .................. 2021-085644

(51) Int. Cl.
*H02K 1/28* (2006.01)
*H02K 1/27* (2022.01)
*H02K 1/276* (2022.01)
*H02K 15/03* (2006.01)
*H02K 15/12* (2006.01)

(52) U.S. Cl.
CPC .............. *H02K 1/28* (2013.01); *H02K 1/276* (2013.01); *H02K 15/03* (2013.01); *H02K 15/12* (2013.01)

(58) Field of Classification Search
CPC .......... H02K 1/28; H02K 1/276; H02K 15/03; H02K 15/12; H02K 1/2766; H02K 1/274; H02K 1/22
See application file for complete search history.

(56) References Cited

U.S. PATENT DOCUMENTS
2020/0235619 A1 7/2020 Uchida

FOREIGN PATENT DOCUMENTS

| CN | 104854781 A | * | 8/2015 | .............. H02K 1/17 |
|----|----|----|----|----|
| JP | 2019-140848 A | | 8/2019 | |
| JP | 2020-115712 A | | 7/2020 | |
| JP | 2021040394 A | * | 3/2021 | |

* cited by examiner

*Primary Examiner* — Thomas Truong
(74) *Attorney, Agent, or Firm* — Finnegan, Henderson, Farabow, Garrett & Dunner, LLP

(57) ABSTRACT

A rotor for an electric motor may include a rotor core having a hole; a magnet inserted in the hole; and a sheet disposed between an inner surface of the hole and a side surface of the magnet, wherein the side surface faces the inner surface. The sheet may include a first contact layer contacting the inner surface of the hole; a second contact layer contacting the side surface of the magnet; and a body layer including a porous structure and disposed between the first contact layer and the second contact layer. The body layer may have a higher porosity than at least one of the first contact layer and the second contact layer.

5 Claims, 8 Drawing Sheets

ROTOR FOR ELECTRIC MOTOR, MANUFACTURING METHOD THEREOF, AND MANUFACTURING METHOD OF SHEET USED IN THE MANUFACTURING METHOD

CROSS-REFERENCE TO RELATED APPLICATION

This application claims priority to Japanese Patent Application No. 2021-085644 filed on May 20, 2021, the contents of which are hereby incorporated by reference into the present application.

TECHNICAL FIELD

Teachings disclosed herein relate to a rotor for an electric motor, a manufacturing method thereof, and a manufacturing method of a sheet used in the manufacturing method.

BACKGROUND

Japanese Patent Application Publication No. 2020-115712 describes a rotor for an electric motor. The rotor includes a rotor core having a hole (referred to as a magnet insertion hole in Japanese Patent Application Publication No. 2020-115712), a magnet inserted in the hole, and a sheet (referred to as an insulating sheet in Japanese Patent Application Publication No. 2020-115712) wrapped around the magnet. The sheet is constituted of a burnable material and expands its volume when heated after having been inserted along with the magnet into the hole of the rotor core. The expanded sheet fills a space between an inner surface of the hole and a side surface of the magnet, thereby fixing the magnet in the hole.

SUMMARY

In the rotor of Japanese Patent Application Publication No. 2020-115712, the more the sheet expands, the more surely the space between the inner surface of the hole and the side surface of the magnet can be filled with the expanded sheet. On the other hand, the more the sheet expands, the higher a porosity of the expanded sheet becomes, decreasing adhesion of the sheet to the inner surface of the hole and the side surface of the magnet. Such conventional configurations have difficulties in improving both expandability and adhesion of the sheet. The disclosure herein provides a technique that improves both expandability and adhesion of a sheet.

A technique disclosed herein is embodied as a rotor for an electric motor. The rotor may comprise a rotor core having a hole, a magnet inserted in the hole, and a sheet disposed between an inner surface of the hole and a side surface of the magnet, wherein the side surface faces the inner surface. The sheet may comprise a first contact layer contacting the inner surface of the hole, a second contact layer contacting the side surface of the magnet, and a body layer including a porous structure and disposed between the first contact layer and the second contact layer. The body layer may have a higher porosity than at least one of the first contact layer and the second contact layer. Here, each of the first contact layer and the second contact layer may or may not include a porous structure. That is, a porosity may be zero in at least one of the first contact layer and the second contact layer.

In the rotor described above, the sheet comprises the first contact layer contacting the inner surface of the hole, the second contact layer contacting the side surface of the magnet, and the body layer disposed between the first contact layer and the second contact layer. Further, the body layer has a higher porosity than at least one of the first contact layer and the second contact layer. According to this configuration, the body layer having greatly expanded can improve expandability of the sheet, while the first contact layer and/or the second contact layer having a lower porosity can improve adhesion of the sheet.

The disclosure herein further discloses a manufacturing method of a rotor for an electric motor. The method may comprise inserting a sheet and a magnet into a hole of the rotor and expanding the sheet located in the hole. The sheet may comprise a first contact layer contacting an inner surface of the hole, a second contact layer contacting a side surface of the magnet, wherein the side surface faces the inner surface, and a body layer including a porous structure and disposed between the first contact layer and the second contact layer. The body layer may expand more than at least one of the first contact layer and the second contact layer, such that the body layer has a higher porosity than the at least one of the first contact layer and the second contact layer.

In the manufacturing method described above, the body layer expands more than the at least one of the first contact layer and the second contact layer does in the expanding step, such that the body layer has a higher porosity than the at least one of the first contact layer and the second contact layer. According to the manufacturing method, it is possible to improve the expandability of the sheet by mainly expanding the body layer while improving the adhesion of the sheet by the first contact layer and/or the second contact having the lower porosity.

Details and further improvements of the technique disclosed herein will be described in Detailed Description below.

DETAILED DESCRIPTION

In one embodiment of the present technique, the body layer may have a higher porosity than both the first contact layer and the second contact layer. According to this configuration, the sheet firmly adheres to both the inner surface of the hole and the side surface of the magnet, and thus the magnet is more firmly fixed.

In one embodiment of the present technique, the hole may penetrate the rotor core in an axial direction of the rotor. A magnet fixed in a through hole is more likely to come off compared to a magnet fixed in a bottomed hole. Thus, the technique described above is useful for a rotor including a through hole.

In one embodiment of the present technique, the sheet may comprise glass fibers and resin. In this case, the body layer may comprise the glass fibers more than at least one of the first contact layer and the second contact layer does, and the at least one of the first contact layer and the second contact layer may comprise the resin more than the body layer does. However, in another embodiment, the body layer may comprise, instead of the glass fibers, a material that expands by a chemical reaction, such as neutralization, in a higher content than at least one of the first contact layer and the second contact layer does.

In one embodiment of the present technique, the rotor core may be configured as a stack of a plurality of steel plates. However, in another embodiment, the rotor core may be made by cutting out a steel material.

In one embodiment of the present technique, the sheet may be expanded by application of heat. However, in another embodiment, the sheet may be expanded by a chemical reaction such as neutralization.

In one embodiment of the present technique, a manufacturing method of the sheet may comprise stacking a first material layer configuring the body layer and a second material layer configuring at least one of the first contact layer and the second contact layer; and compressing a stack of the first material layer and the second material layer while applying heat to the stack. The first material layer and the second material layer may be constituted of a thermoplastic material, and at least the first material layer of the first material layer and the second material layer may comprise a fiber material. The first material layer may comprise the liber material more than the second material layer does. According to this manufacturing method, expandability of the sheet can be improved by the first material layer comprising, a higher content of the fiber material and a porosity of the first contact layer and/or the second contact layer can be maintained at a low level, with the relatively easy steps.

Embodiments

Figure 1:
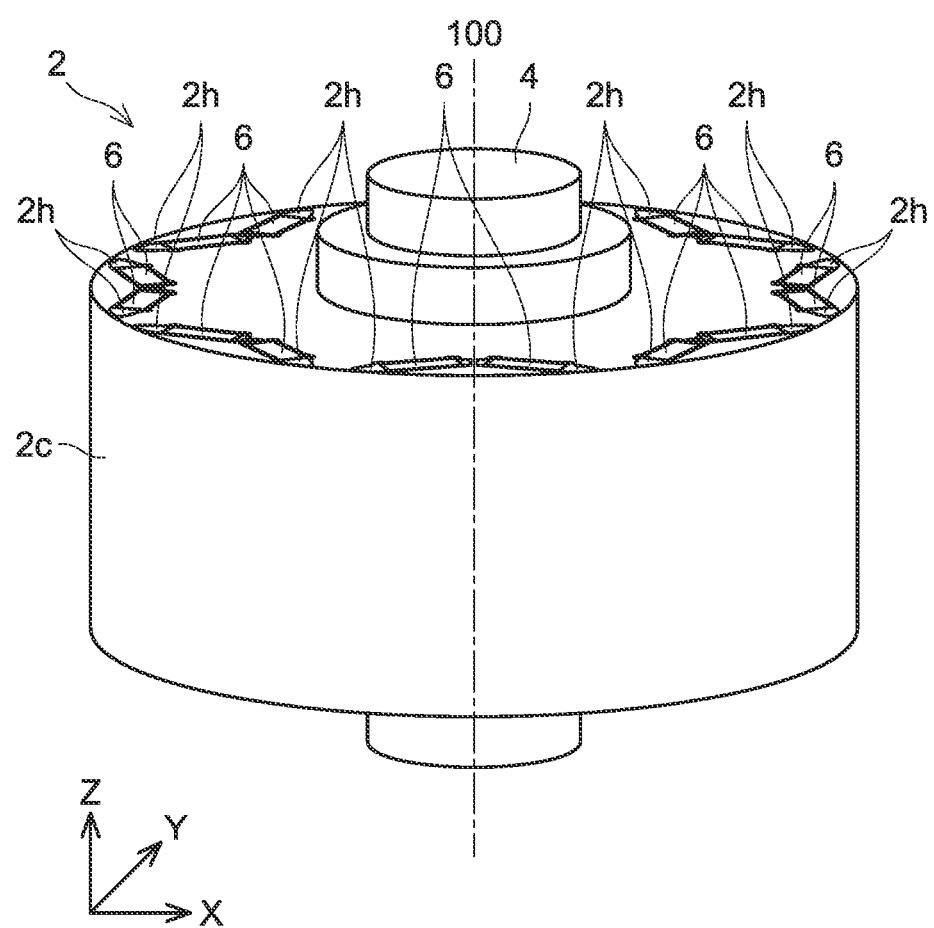
FIG. 1 illustrates a perspective view of a rotor 2 according to an embodiment.

Referring to FIG. 1, a rotor 2 according to an embodiment will be described. A Z-axis illustrated in the drawings is parallel to an axis 100 of the rotor 2. An XY plane is perpendicular to the Z-axis. In the disclosure herein, a direction parallel to the Z-axis may be simply termed "an axial direction". Further, a direction of a line that is parallel to the XY plane and passes the intersection point of the axis 100 with the XY plane may be simply termed "a radial direction".

The rotor 2 constitutes an electric motor (not illustrated). A stator is disposed radially outward of the rotor 2, although this is not illustrated. When a current flows through coils of the stator, a magnetic force is generated between the rotor 2 and the stator, and the rotor 2 thereby rotates about the axis 100. The rotor 2 constitutes a radial gap electric motor.

As illustrated in FIG. 1, the rotor 2 comprises a rotor core 2c, a shaft 4, and magnets 6. The rotor core 2c is configured as a stack of a plurality of steel plates stacked in the axial direction. The steel plates of the rotor core 2c are insulated from each other. Since the rotor core 2c is configured as a stack of insulated steel plates, an overcurrent is less likely to occur in the rotor core 2c. Further, an iron loss in the rotor 2 can be thereby reduced.

The rotor core 2c includes a plurality of holes 2h. Holes are defined in advance in the steel plates of the rotor core 2c, and the holes are overlapped over each other when the steel plates are stacked, thereby forming the holes 2h penetrating the rotor core 2c in the axial direction. Each of the magnets 6 is inserted in corresponding one of the holes 2h. The shaft 4 has a cylindrical shape extending in the axial direction. The shaft 4 penetrates a center portion of the rotor core 2c in the axial direction.

Figure 2:
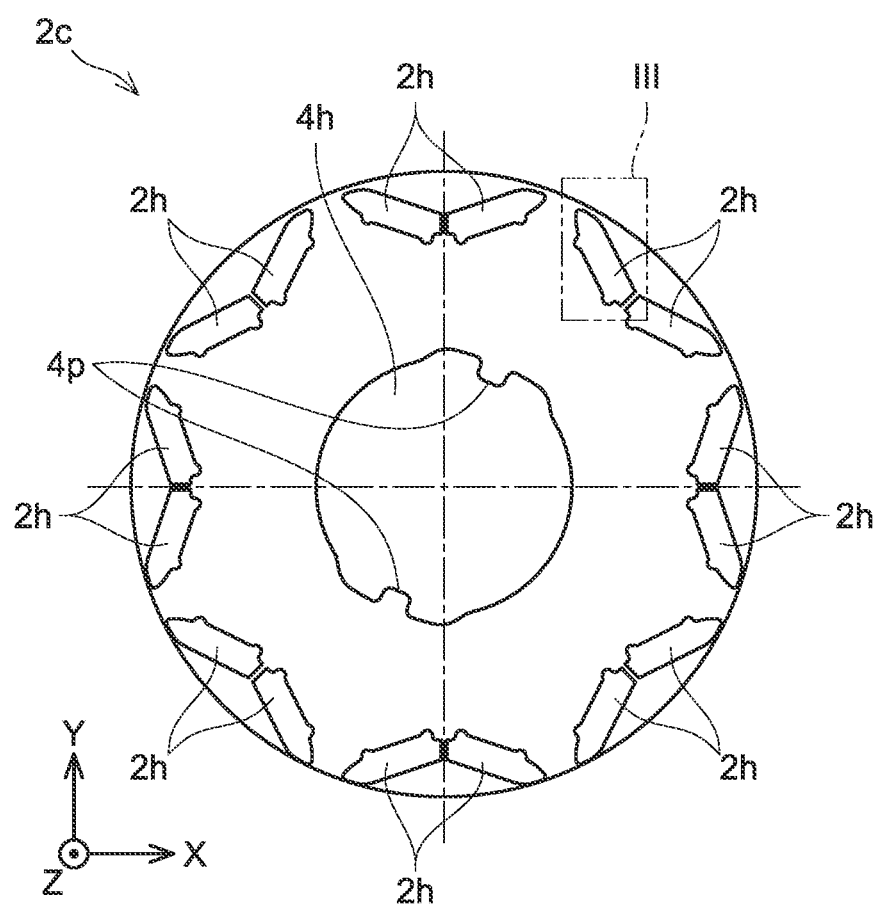
FIG. 2 illustrates a plan view of a rotor core 2c.

As illustrated in FIG. 2, the rotor core 2c includes sixteen holes 2h. The sixteen holes 2h are divided into and arranged in eight pairs. Each pair of the holes 2h corresponds to one pole of the rotor 2 (see FIG. 1). That is, the rotor core 2c has the holes 2h corresponding to eight poles in total. The holes 2h of each pair are arranged symmetrically. The pairs of the holes 2h are arranged along an outer circumference of the rotor core 2c such that they face the center of the rotor core 2c. The number of the holes 2h in the rotor core 2c can be adjusted according to the number of poles of the rotor 2.

A shaft hole 4h is defined in the center portion of the rotor core 2c. The shaft hole 4h penetrates the rotor core 2c in the axial direction. Two projections 4p are disposed on an inner surface of the shaft hole 4h. One of the projections 4p is positioned to face the other projection 4p. Grooves are defined on both sides of each projection 4p. The shaft 4 (see FIG. 1) is fixed to the rotor core 2c by engaging with the projections 4p and the grooves of the shaft hole 4h.

Figure 3:
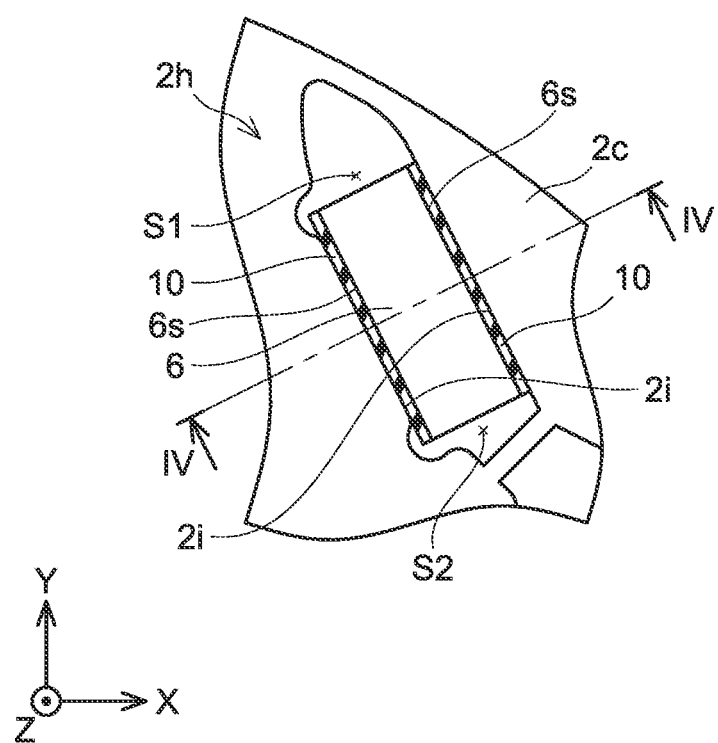
FIG. 3 illustrates an enlarged view of an area enclosed by a dashed-double dotted line III in FIG. 2.

Referring to FIG. 3, the shape of the holes 2h will be described in detail. FIG. 3 illustrates an enlarged view of an area enclosed by a dashed-double dotted line III in FIG. 2, that is, an enlarged view of one hole 2h. The other holes 2h have substantially the same shape as the illustrated hole 2h. The hole 2h has a substantially rectangular shape. The width of the hole 2h is gradually narrowed near one of longitudinal ends (an upper end in FIG. 3) of the hole 2h. A flat surface extending toward the center of the rotor core 2c (i.e., the axis 100) is positioned at the other longitudinal end (a lower end in FIG. 3) of the hole 2h. The shape of the hole 2h is the combination of a substantially rectangular shape and multiple shapes. The hole 2h comprises inner surfaces 2i facing each other in a width direction of the hole 2h. One of the inner surfaces 2i extends substantially parallel to the other inner surface 2i. That is, a distance between the one inner surface 2i and the other inner surface 2i is constant.

As illustrated in FIG. 3, the magnet 6, which has a rectangular shape, is inserted in the hole 2h of the rotor core 2c in a direction of the axis 100 (i.e., in the axial direction). As described, the rotor core 2c is configured as a stack of steel plates. A magnetic flux is generated in the rotor core 2c by the magnet 6 being inserted into the hole 2h of the rotor core 2c of the steel plates stack. Sheets 10 are disposed between the inner surfaces 2i of the hole 2h of the rotor core 2c and side surfaces 6s of the magnet 6, where the side surfaces 6s face the inner surfaces 2i. Although details will be described referring to FIG. 4, the magnet 6 is fixed in the hole 2h by the sheets 10.

The sheets 10 comprise resin. Thus, the sheets 10 also function as insulators that prevent electrical conduction between the magnets 6 and the rotor core 2c. The presence of the sheets 10 between the inner surfaces 2i and the side surfaces 6s prevents a direct contact of the side surfaces 6s of the magnet 6 with the inner surfaces 2i of the rotor core 2c. If the side surfaces 6s directly contact the inner surfaces 2i and electrical conduction occurs therebetween, an iron loss occurs in the rotor 2 (see FIG. 1). The iron loss can be reduced in the rotor 2 since the sheets 10 comprising resin are disposed between the side surfaces 6s and the inner surfaces 2i.

There is a space S1 between one of longitudinal ends of the magnet 6 and the one of the longitudinal ends (the upper end in FIG. 3) of the hole 2h, and there is a space S2 between the other longitudinal end of the magnet 6 and the other longitudinal end (the lower end in FIG. 3) of the hole 2h. The spaces S1 and S2 penetrate the rotor core 2c in the axial direction. When the rotor 2 (see FIG. 1) incorporated in the electric motor (not illustrated) rotates, the magnets 6 generates heat. The longitudinal ends of the magnet 6 are exposed to the spaces S1 and S2. Oil for cooling the magnet 6 circulates through the spaces S1 and S2 while the rotor 2 is rotating, thereby directly cooling the longitudinal ends of the heated magnet 6.

Figure 4:
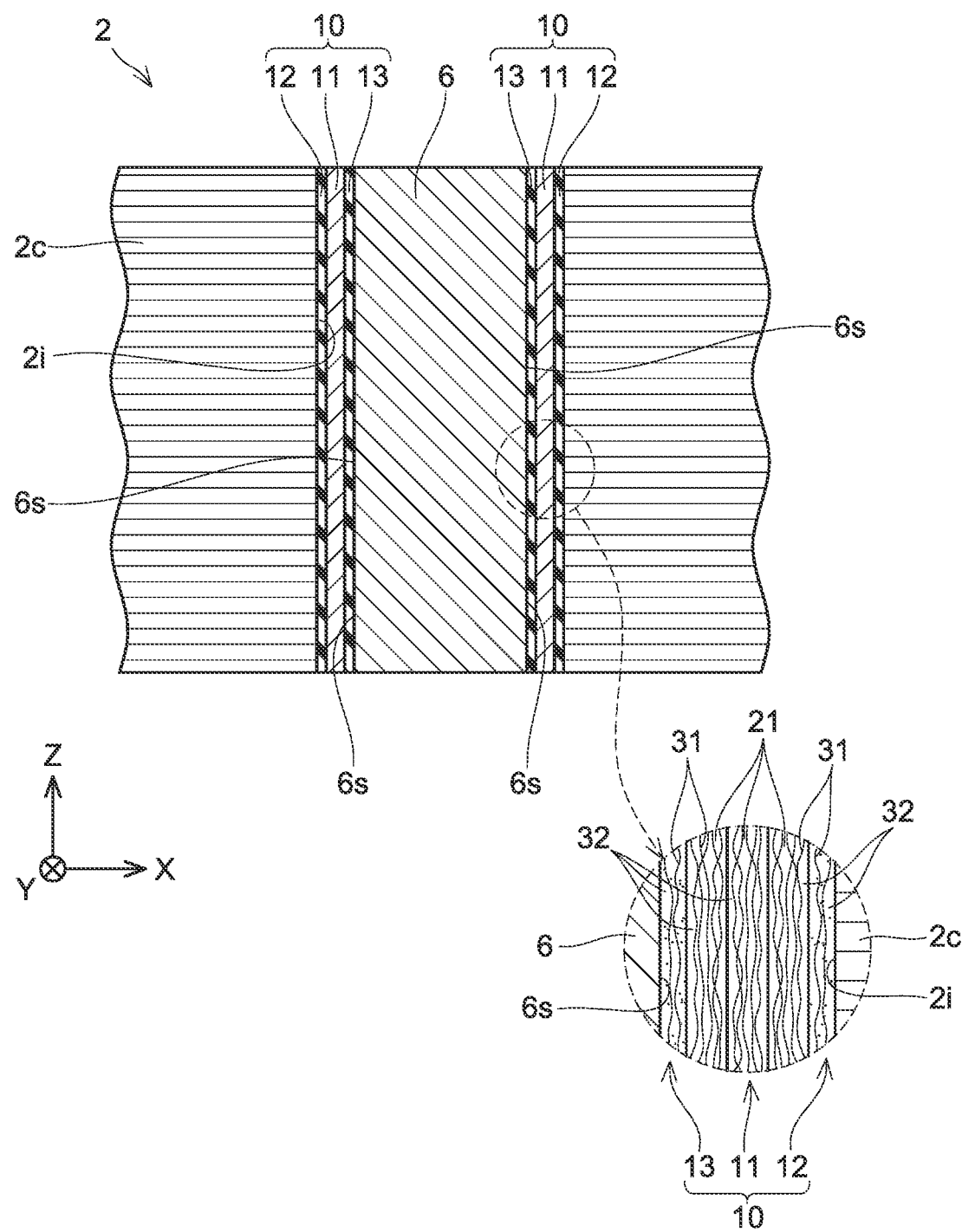
FIG. 4 illustrates a cross-sectional view along a line IV-IV in FIG. 3.

Referring to FIG. 4, the structure of the sheets 10 will be described in detail. Each sheet 10 comprises a body layer 11, a first contact layer 12, and a second contact layer 13. Each first contact layer 12 contacts its corresponding inner surface 2i of the rotor core 2c. Each second contact layer 13 contacts its corresponding side surface 6s of the magnet 6. Each body layer 11 is disposed between the contact layers 12 and 13.

The lower diagram in FIG. 4 illustrates an enlarged view of a cross section of one of the sheets 10. The body layer 11 includes three fiber layers 21. Each fiber layer 21 comprises glass fibers 31 and resin 32. The glass fibers 31 are a fiber material extending in the axial direction in a meandering pattern. Each glass fiber 31 is at least partially coated by the resin 32. Gaps are provided between the glass fibers 31 to separate them apart from each other. That is, the body layer 11 comprising the glass fibers 31 has a porous structure. As described, oil for cooling the magnets 6 circulates through the holes 2h of the rotor core 2c. Since the body layers 11 have a porous structure, the oil flows between the glass fibers 31 of the body layers 11. Thus, the sheets 10 can cool the magnets 6 from the side surfaces 6s by the oil flowing through the body layers 11. This enhances cooling efficiency for the magnets 6 compared to a configuration in which the body layers 11 do not have a porous structure. Similarly, the sheets 10 can cool the rotor core 2c from the inner surfaces 2i by the oil flowing through the body layers 11.

As with the body layer 11, the contact layers 12, 13 comprise the glass fibers 31 and the resin 32. That is, as with the body layer 11, the contact layers 12, 13 have a porous structure. As illustrated in the enlarged view in FIG. 4, a content of the glass fibers 31 in each contact layer 12, 13 is less than a content of the glass fibers 31 in the body layer 11. Thus, each of the contact layers 12, 13 has a lower porosity than the body layer 11. Each of the contact layers 12, 13 comprises a higher content of the resin 32 than the content of the glass fibers 31. Although the body layer 11 comprises the resin, the content of the resin 32 in the body layer 11 is less than the content of the resin 32 in each contact layer 12, 13. The resin 32 has thermal plasticity. The resin 32 is, for example, polyetherimide (PEI).

Although details will be described referring to FIG. 9, the first contact layers 12 adhere to the inner surfaces 2i of the holes 2h of the rotor core 2c by the resin 32 in the first contact layers 12 being melted by application of heat and then cooled. Similarly, the second contact layers 13 adhere to the side surfaces 6s of the magnets 6 by the resin 32 in the second contact layers 13 being melted by application of heat and then cooled. Thus, the higher a content of the resin 32 in the contact layers 12, 13 is, the greater the adhesion of the contact layers 12, 13 is.

As described, the contact layers 12, 13 contain more resin 32 than the body layers 11 do. Thus, the adhesion of the contact layers 12, 13 is greater than that of the body layers 11. As illustrated in FIG. 4, in each sheet 10, the first contact layer 12 contacts the inner surface 2i of the hole 2h of the rotor core 2c and the second contact layer 13 contacts the side surface 6s of the magnet 6. Thus, the sheets 10 can firmly fix the magnets 6 in the holes 2h of the rotor core 2c by the contact layers 12, 13 having the high adhesion.

The sheets 10 also fill gaps between the inner surfaces 2i of the holes 2h of the rotor core 2c and the side surfaces 6s of the magnets 6 by expanding. As a result, the first contact layers 12 are pressed against and contact the inner surfaces 2i of the holes 2h of the rotor core 2c. The harder the first contact layers 12 are pressed against the inner surfaces 2i, the more firmly the first contact layers 12 adhere thereto. Similarly, the second contact layers 13 are pressed against and contact the side surfaces 6s of the magnets 6. The harder the second contact layers 13 are pressed against the side surfaces 6s, the more firmly the second contact layers 13 adhere thereto.

The first contact layers 12 are pressed against the inner surfaces 2i and the second contact layers 13 are pressed against the side surfaces 6s by the sheets 10 expanding by application of heat. Thus, the larger the sheets 10 expand, the larger the adhesion of the contact layers 12, 13 becomes.

As described, the body layers 11 comprise the glass fibers 31 more than the contact layers 12, 13 do. Although details will be described referring to FIG. 6, stress generated in the glass fibers 31 due to thermal compression is released by application of heat and the shape of the glass fibers 31 is restored, and the sheets 10 thereby expand. Thus, the higher a content of the glass fibers 31 is, the larger the sheets 10 expand. The body layers 11, which comprise the glass fibers 31 more than the contact layers 12, 13 do, expand larger than the contact layers 12, 13. Thus, the body layers 11 have a higher porosity than the contact layers 12, 13.

As described, it is required for the sheets 10 to comprise a high content of the resin 32 and a high content of the glass fibers 31. However, a higher content of the resin 32 in the sheets 10 means a lower content of the glass fibers 31 in the sheets 10. Similarly, a higher content of the glass fibers 31 in the sheets 10 means a lower content of the resin 32 in the sheets 10.

In each sheet 10, the contact layers 12, 13, which have the high content of the resin, are arranged at both sides of the sheet 10 in the radial direction, and the body layer 11, which has the high content of the glass fibers 31, is arranged between the contact layers 12 and 13. Thus, the first contact layers 12 contact the inner surfaces 2i of the holes 2h of the rotor core 2c, and the second contact layers 13 contact the side surfaces 6s of the magnet 6. The contact layers 12, 13, which have the lower porosity and comprise more resin 32, can firmly adhere to the surfaces 2i, 6s. Further, since more glass fibers 31 are contained in the body layers 11 arranged between the contact layers 12 and 13, the sheets 10 can improve their expandability by the body layers 11 which do not contact the surfaces 2i, 6s. Thus, the sheets 10 can press the contact layers 12, 13 hard against the surfaces 2i, 6s. Thus, the rotor 2 (see FIG. 1) disclosed herein can provide improved expandability and adhesion of the sheets 10.

Figure 5:
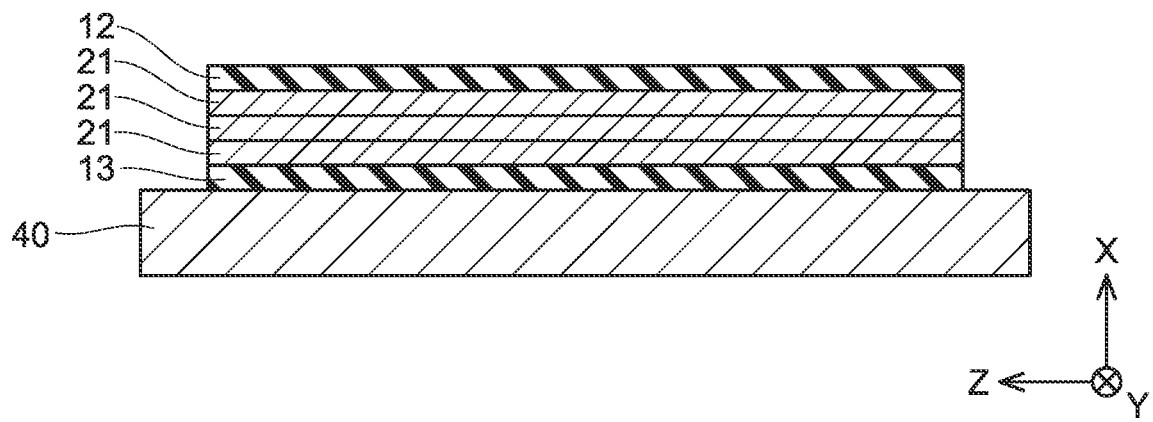
FIG. 5 illustrates a cross-sectional view in a stacking process.
Figure 6:
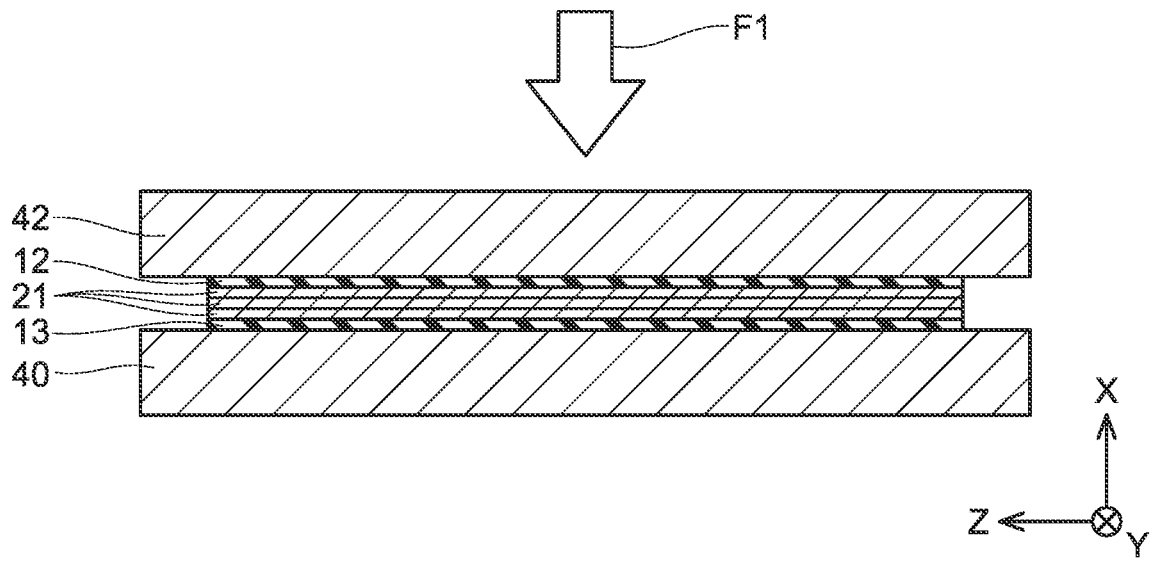
FIG. 6 illustrates a cross-sectional view in a thermal compression process.

Referring to FIGS. 5 and 6, a manufacturing method of the sheet 10 will be described. Firstly, a stacking process will be described referring to FIG. 5. In the stacking process, the second contact layer 13 is placed on an upper surface of a jig 40, and then the three fiber layers 21 and the first contact layer 12 are subsequently stacked thereon. Thus, the three fiber layers 21 are disposed between the second contact layer 13 and the first contact layer 12.

Next, a thermal compression process will be described referring to FIG. 6. In the thermal compression process, a compression jig 42 is moved in the direction of arrow F1 from above toward the stack of the second contact layer 13, the three fiber layers 21, and the first contact layer 12. The compression jig 42 compresses the second contact layer 13, the three fiber layers 21, and the first contact layer 12 in the direction of arrow F1. In the compression, the compression jig 42 and the jig 40 apply heat to the second contact layer 13, the three fiber layers 21, and the first contact layer 12. As described, the contact layers 12, 13 and the fiber layers 21 comprise the glass fibers 31 and the resin 32. Since the resin 32 has thermal plasticity, it softens when heated. In the thermal compression process, the compression jig 42 and the jig 40 compress the second contact layer 13, the three fiber layers 21, and the first contact layer 12 while heating them at a temperature above a glass-transition point of the resin 32. Thus, the glass fibers 31 are easily deformed in the thermal compression process. Therefore, as illustrated in FIG. 6, thickness of each of the second contact layer 13, the three fiber layers 21, and the first contact layer 12 is reduced.

When the thermal compression process is completed, the application of heat by the compression jig 42 and the jig 40 is stopped, and the contact layers 12, 13 and the fiber layers 21 are cooled. Thus, the resin 32 solidifies. The sheet 10 is manufactured as described above. The solidified resin 32 keeps the glass fibers 31 deformed. That is, the thickness of the sheet 10 remains at the reduced thickness.

Figure 7:
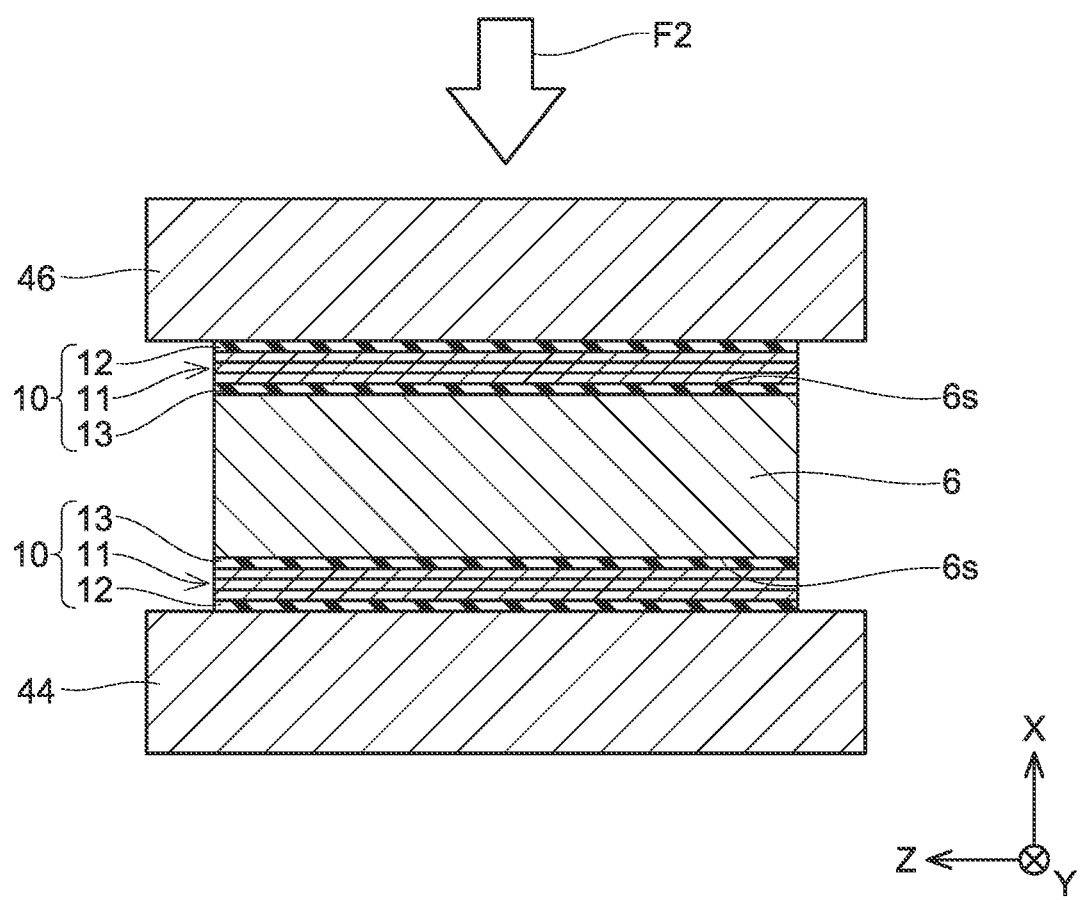
FIG. 7 illustrates a cross-sectional view in a sheet pressure bonding process.
Figure 8:
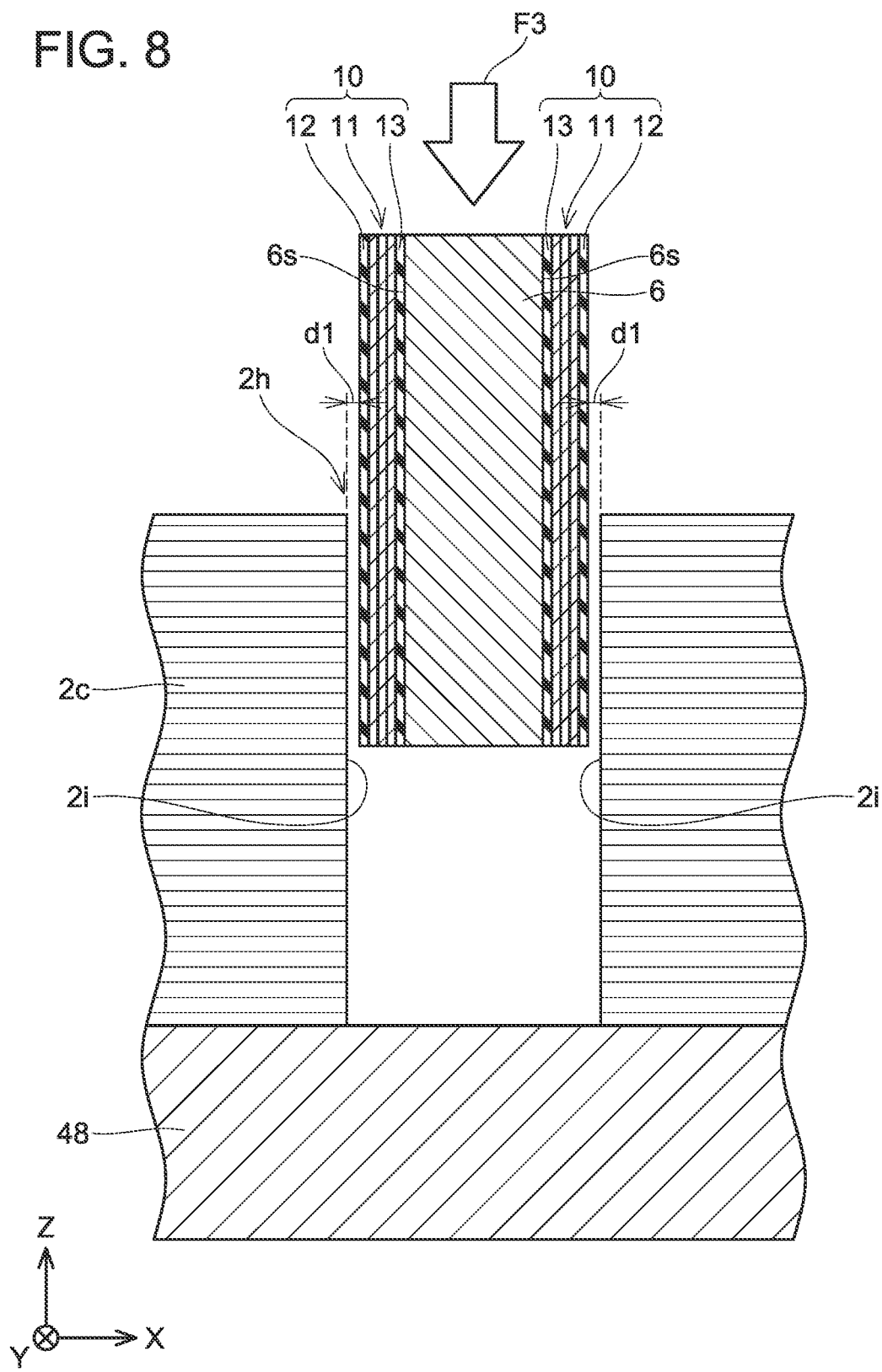
FIG. 8 illustrates a cross-sectional view in a magnet insertion process.
Figure 9:
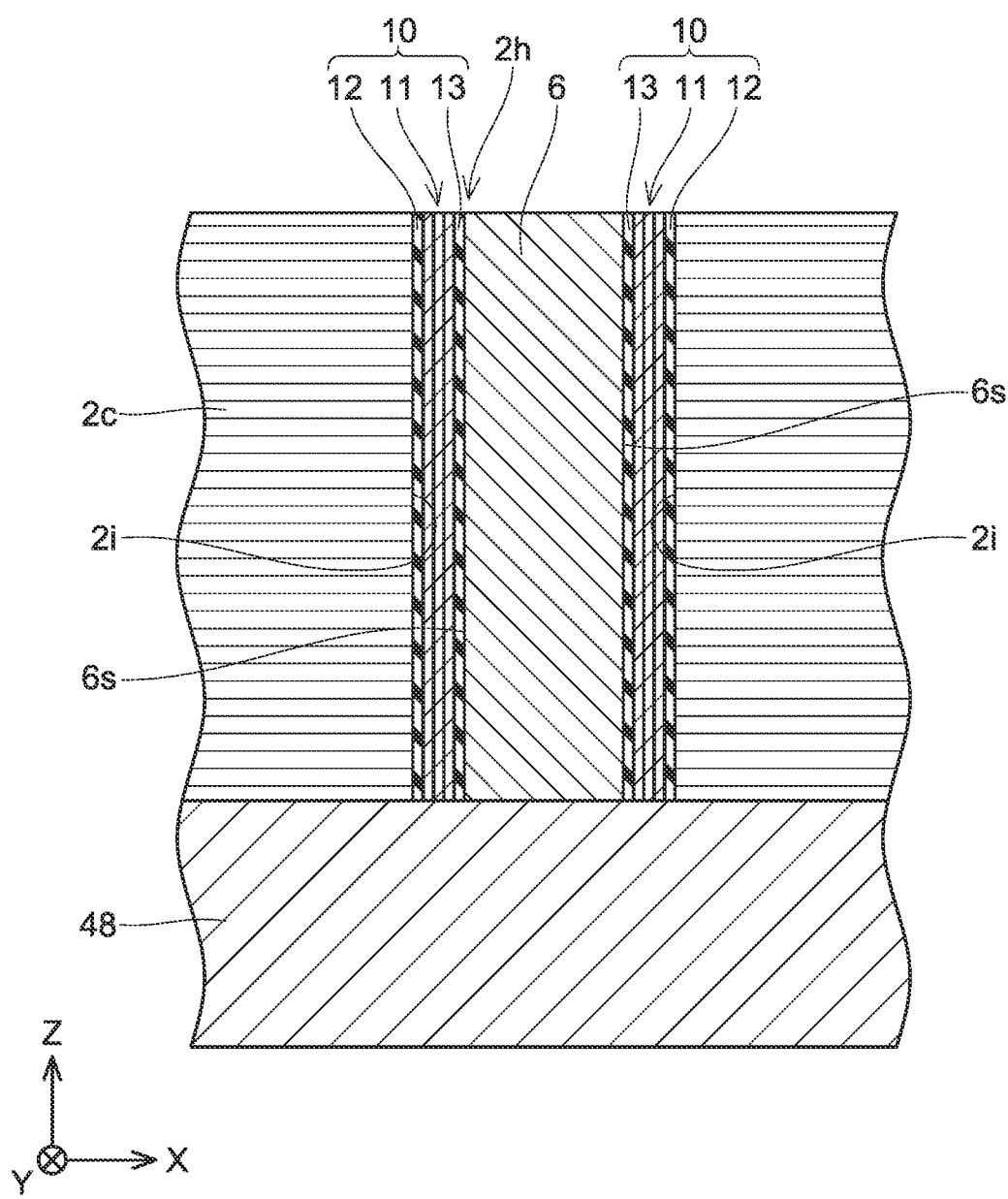
FIG. 9 illustrates a cross-sectional view in an expansion process.

Referring to FIGS. 7 to 9, a manufacturing method of the rotor 2 (see FIG. 1) will be described. Firstly, a sheet pressure bonding process will be described referring to FIG. 7. In the sheet pressure bonding process, the sheet 10 is placed on a thermal pressure bonding jig 44, and then the magnet 6 and another sheet 10 are subsequently placed thereon. As a result, the side surfaces 6s of the magnet 6 contact the second contact layers 13 of the sheets 10. Further, the sheets 10 and the magnet 6 are compressed in the direction of arrow F2 by a thermal pressure bonding jig 46. In the compression, the thermal pressure bonding jigs 44, 46 heat the sheets 10 and the magnet 6 at a melting temperature of the resin 32. Then, the sheets 10 and the magnet 6 are cooled. Thus, the contact layers 13 are bonded to the side surfaces 6s of the magnet 6 by the resin 32.

Next, referring to FIG. 8, a magnet insertion process will be described. In the magnet insertion process, the magnet 6 and the sheets 10 adhering to the side surfaces 6s on both sides of the magnet 6 are inserted into the hole 2h of the rotor core 2c in the direction of arrow F3. As described, since the sheets 10 were compressed while being heated in the thermal compression process and the sheet pressure bonding process, the sheets 10 have reduced thickness. Thus, in the magnet insertion process, there are spaces d1 between the first contact layers 12 of the sheets 10 and the inner surfaces 2i of the hole 2h, as illustrated in FIG. 8. Thus, the sheets 10 are less likely to interfere with the inner surfaces 2i in the magnet insertion process. Insertion of the magnet 6 can be facilitated by inserting the magnet 6, to which the sheets 10 with reduced thickness adhere, into the hole 2h. In the magnet insertion process, the magnet 6 and the sheets 10 are inserted until a lower surface of the magnet 6 contacts an upper surface of a support jig 48, which supports the rotor core 2c from below.

Next, referring to FIG. 9, an expansion process will be described. In the expansion process, heat is applied to the rotor core 2c, the magnet 6, and the sheets 10 with the magnet 6 and the sheets 10 inserted in the hole 2h. The rotor core 2c, the magnet 6, and the sheets 10 are heated at a temperature above the glass-transition point of the resin 32. Thus, the resin 32 softens. As a result, the glass fibers 31 deformed in the thermal compression process (FIG. 6) are restored to the original shape, increasing the thickness of the sheets 10. That is, the sheets 10 expand. The sheets 10 thus fill spaces between the side surfaces 6s of the magnet 6 and the inner surfaces 2i of the hole 2h. As a result, the first contact layers 12 are pressed against the inner surfaces 2i of the hole 2h. Further, the resin 32 in melting state is pressed against the inner surfaces 2i. After the sheets 10 have expanded, the rotor core 2c, the magnet 6, and the sheets 10 are cooled. Thereby, the resin 32 solidifies again and the first contact layers 12 adhere to the inner surfaces 2i. After the magnets 6 have been fixed in the holes 2h by the sheets 10, the shaft 4 (see FIG. 1) is finally inserted through the rotor core 2c, completing the rotor 2.

Variants of the embodiment above will be described hereinafter.

(Variant 1) In the rotor 2 described above, each sheet 10 comprises the first contact layer 12 and the second contact layer 13. In the present variant, each sheet 10 may comprise only the first contact layer 12. In this case, the sheets 10 may be bonded to the magnets 6 via an adhesive.

(Variant 2) In the rotor 2 described above, two sheets 10 are used to fix a magnet 6 in each hole 2h. Instead of this, a single sheet 10 may be used to fix a magnet 6 in each hole 2h in the present variant.

(Variant 3) In the rotor 2 described above, the holes 2h penetrate the rotor core 2c in the axial direction. In the present variant, the holes 2h may be recesses defined in the rotor core 2c.

(Variant 4) The rotor 2 described above is manufactured using the rotor core 2c configured as a stack of a plurality of steel plates. Instead of this, the rotor core 2c of a single body may be used.

(Variant 5) In the manufacturing method of the rotor 2 described above, the sheets 10 are pressure bonded to the magnets 6 in the sheet pressure bonding process, and then the magnets 6 and the sheets 10 are inserted into the holes 2h of the rotor core 2c in the magnet insertion process. Instead of this, the magnets 6 may be inserted into the holes 2h first, and then the sheets 10 may be inserted in between the side surfaces 6s of the magnets 6 and the inner surfaces 2i of the holes 2h, in the present variant. Further, in another variant, a pair of sheets 10 may be inserted into each hole 2h first, and then each magnet 6 may be inserted in between corresponding pair of the sheets 10.

(Variant 6) In the rotor 2 described above, the sheets 10 comprise the resin 32 and the glass fibers 31. In the present variant, the sheets 10 may comprise a material that expands by a chemical reaction such as neutralization, instead of the glass fibers 31. In this case, the body layers 11 may comprise the material more than the contact layers 12, 13 do. Further, in this case, the sheets 10 may be expanded in the expansion process by addition of a substance that expands the material, instead of the application of heat. The body layers 11 may comprise a material that expands by application of heat, instead of the glass fibers 31.

(Variant 7) In the rotor 2 described above, the body layer 11 of each sheet 10 includes the three fiber layers 21. In the present variant, each body layer 11 may include a single fiber layer 21, or may include two, four, or more than four fiber layers 21.

(Variant 8) In the rotor 2 described above, the contact layers 12, 13 of the sheets 10 comprise the glass fibers 31. In the present variant, the contact layers 12, 13 may not comprise the glass fibers 31. In this case, the contact layers 12, 13 may be formed by applying the resin 32 on surfaces of a stack of the fiber layers 21.

(Variant 9) In the rotor 2 described above, identical three fiber layers 21 are stacked between the contact layers 12 and 13. In the present variant, the middle fiber layer of the three fiber layers 21 may comprise the glass fibers 31 more than the other fiber layers 21 do. Thus, the content of the glass fibers 31 is the largest in the center of each sheet 10 in the thickness direction, and the content of the resin 32 is the largest in surface portions of each sheet 10 in the thickness direction. In the sheets 10, the amounts of the glass fibers 31 (i.e., porosity) and the resin 32 may be varied in the thickness direction of the sheets 10.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A rotor for an electric motor, comprising:
   a rotor core having a hole;
   a magnet inserted in the hole; and
   a sheet disposed between an inner surface of the hole and a side surface of the magnet, wherein the side surface faces the inner surface,
   wherein
   the sheet comprises:
      a first contact layer contacting the inner surface of the hole;
      a second contact layer contacting the side surface of the magnet; and
      a body layer including a porous structure and disposed between the first contact layer and the second contact layer, and
   the body layer has a higher porosity than at least one of the first contact layer and the second contact layer, wherein
   the sheet comprises glass fibers and resin,
   the body layer comprises the glass fibers more than at least one of the first contact layer and the second contact layer does, and
   the at least one of the first contact layer and the second contact layer comprises the resin more than the body layer does.

2. The rotor according to claim 1, wherein the body layer has a higher porosity than both the first contact layer and the second contact layer.

3. The rotor according to claim 2, wherein the hole penetrates the rotor core in an axial direction of the rotor.

4. The rotor according to claim 1, wherein the hole penetrates the rotor core in an axial direction of the rotor.

5. The rotor according to claim 1, wherein the rotor core is configured as a stack of a plurality of steel plates.

* * * * *